W. F. DOERFLINGER.
MANUFACTURE OF STANNIC CHLORID.
APPLICATION FILED FEB. 5, 1908.
1,055,617.
Patented Mar. 11, 1913.
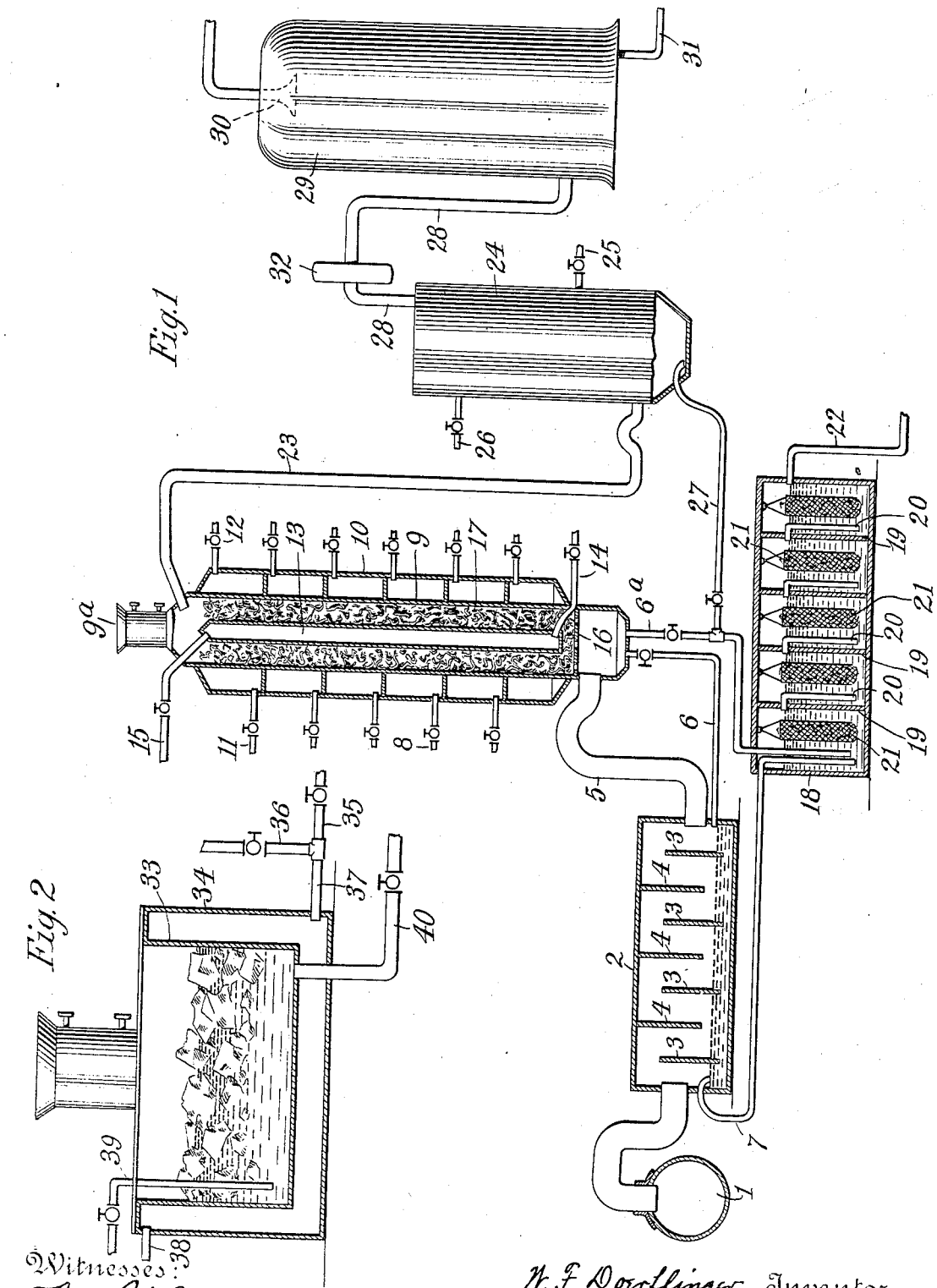

UNITED STATES PATENT OFFICE.

WILLIAM F. DOERFLINGER, OF NEW YORK, N. Y., ASSIGNOR, BY MESNE ASSIGNMENTS, TO NIAGARA ALKALI COMPANY, A CORPORATION OF NEW YORK.

MANUFACTURE OF STANNIC CHLORID.

1,055,617. Specification of Letters Patent. Patented Mar. 11, 1913.

Application filed February 5, 1908. Serial No. 414,299.

*To all whom it may concern:*

Be it known that I, WILLIAM F. DOERFLINGER, a citizen of the United States, residing at New York, in the county of Kings and State of New York, have invented certain new and useful Improvements in the Manufacture of Stannic Chlorid, of which the following is a specification.

In my improved process, anhydrous stannic chlorid is produced by the action of dry chlorin gas, in the presence of stannic chlorid vapor, upon metallic tin, preferably at a temperature of about 35° C., the heat of reaction being dissipated by cooling surfaces near the point of reaction and the anhydrous chlorid being allowed to drain away as formed. This stannic chlorid, or part of it, I use to saturate the entering chlorin gas with stannic chlorid vapor for the purpose of removing the last trace of water from the chlorin. The presence of water being prejudicial, the use of stannic chlorid vapor as mentioned is desirable since, as I have found, it is difficult otherwise to get the chlorin thoroughly dry. In fact, I have found that chlorin, even after passing through a sulfuric acid drying tower, usually contains enough moisture to interfere with the smooth course of the manufacture and often results in the formation of undesirable by-products. To saturate the chlorin with the stannic chlorid vapor I prefer to pass the chlorin in inverse direction to a stream of anhydrous stannic chlorid, on the counter-current principle. This may take place in a part of the same apparatus, hereafter referred to as the absorber, in which the tin and the dry chlorin combine, but I prefer to employ for the purpose a separate apparatus. This apparatus I term the saturator, and in it the chlorin, passing over an extended surface of liquid stannic chlorid flowing in the opposite direction, becomes saturated with stannic chlorid vapor. With the latter such moisture as the chlorin may contain combines to form tri-hydrate, which drops to the bottom and may be melted and run off from time to time. The liquid anhydrous stannic chlorid flowing from the absorber and saturator is yellow from dissolved chlorin, which may be removed by digestion with metallic tin, in practice very simply by allowing the chlorid to flow past and in contact with the tin. If the chlorid is in motion the action proceeds rapidly, but if it is quiet it may stand in contact with the tin for a long time before the chlorin is entirely removed. It is preferable to have the tin suspended in the stream instead of lying on the bottom of the apparatus below the stream, as the former tends to make the action more rapid and complete. I now have a clear, colorless, liquid anhydrous stannic chlorid, which may be marketed as such; but in this form it is disagreeable to use, and its use in preparing bichlorid solution for weighting silk, etc., often results in waste of the bichlorid, or the formation of free acid or basic salts in the bath which injure the silk, etc. Its transportation is also difficult and expensive. I therefore in general prefer to convert it into solid crystalline hydrate or a solution of a hydrate and market it in such form. In producing the hydrate, the combination of the water and the anhydrous stannic chlorid is very violent and may result in local decomposition, injuring the product, even when conducted with external cooling. This danger is obviated by my method of producing solid from anhydrous stannic chlorid. I place in a vessel provided with jacketed walls a part of the water necessary to form the desired amount of hydrate, in the form of ice, and then run in the anhydrous bichlorid, which may have been previously cooled. The amount of ice is regulated so that the heat of reaction will not be sufficient to raise the entire mass above a predetermined degree. In general I prefer to keep the temperature well below 50° C. When the ice is all melted, or while it is melting, I circulate a cooling medium through the jacket and reduce the temperature to say 0° C., then I gradually add the rest of the ice, necessary to form the desired quantity of hydrate, at such rate that the temperature never rises above the desired point. Near the end of the addition I allow the temperature to rise gradually above the melting point of the hydrate, even aiding the melting by circulating warm fluid through the jacketed walls if necessary. When the hydrate is all melted, and the contents of the vessel have become uniform throughout, I run the hydrate off into molds to cool and set. It can then be marketed in such form, or it can be ground and sold as crystalline powder, or dissolved in water and sold as an aqueous solution.

As a specific example of producing say pentahydrate, I place 60 lbs. of ice in a vessel with jacketed walls, and run in upon the ice 743.5 lbs. of anhydrous bichlorid, previously cooled to 0° C. During the addition I circulate brine in the jacket at a temperature of —10° C. When no more heat is evolved, and the temperature has got to about 0° C., I gradually add 196.5 lbs. more ice, keeping the temperature down by the flow of cooling brine in the jacket. At the end I allow the temperature to rise to about 5° C. above the melting point of the hydrate, allow it to become uniform throughout, and then run it off into molds to solidify. This specific case is given merely by way of example and as the preferred mode of operation, this part of the invention consisting, generally, in admixing all or part of the water, necessary to form hydrate from anhydrous stannic chlorid, in the form of ice, and dissipating more or less of the heat, evolved by the reaction, by means of the latent heat of fusion of the ice, thus avoiding overheating either local or general.

It will be understood, of course, that in practising my method any suitable apparatus may be employed. In the annexed drawing I have illustrated, somewhat diagrammatically, a simple and convenient apparatus for the purpose. Therein, Figure 1 is a side view partly in vertical section of the apparatus for producing the anhydrous stannic chlorid. Fig. 2 is a section of the vessel in which the stannic chlorid is converted into hydrate.

Referring now to the drawing, the preferred manner of practising my method is as follows: The chlorin, preferably produced electrolytically, and by preference dried as thoroughly as possible, is delivered to the apparatus through a conduit 1, from which it passes to the saturator 2. The latter is divided into successive communicating compartments by partitions 3, 4, those numbered 3 leaving spaces at both top and bottom and those numbered 4 leaving spaces only at the bottom, as shown. The chlorin gas in flowing through the saturator to the gas outlet pipe 5 is therefore given a tortuous course, and in passing under partitions 4 is brought into close association with a stream of liquid anhydrous stannic chlorid entering the vessel from the pipe 6 and issuing therefrom through the pipe 7, and hence flowing in opposite direction to the current of chlorin. The chlorin is thus saturated with the chlorid vapor which at once combines with any moisture which may be mixed with the chlorin, forming solid trihydrate. The latter collects on the bottom of the saturator and may be removed from time to time in any convenient way. From the saturator or drier 2 the chlorin containing of course more or less chlorid vapor, is led through the pipe 5 to the bottom portion of the absorber 8. The latter comprises an upwardly extending narrow chamber 9 provided with a jacket 10. The space between the jacket and the chamber is divided into compartments by horizontal partitions as shown. Each compartment has an inlet pipe 11 by which a cooling medium, for example brine, may be admitted, and an outlet pipe 12 by which the cooling medium is discharged. The inlet pipes may all be connected with the same source (not shown) of cooling fluid, but in order to regulate the flow through the compartments separately, for better regulation of the cooling effect, each inlet pipe is provided with its own valve, as shown. Similarly, all the outlet pipes 12 may discharge into a common receptacle, not shown, but each is preferably provided with a valve, as indicated. Suitably disposed inside the chamber 9, for example extending longitudinally and centrally thereof, is a cooling pipe or chamber 13, supplied with cooling fluid by a valved supply pipe 14, which may be connected with the same source as the pipes 11. From the cooling pipe 13 the fluid issues through an outlet pipe 15, which may discharge into the same receptacle as the pipes 13. In the annular space thus provided in the chamber 9 is a mass of metallic tin, 17, as pure and as free from oxid as possible, supported above the bottom of the chamber on a transverse perforated partition 16. The dry chlorin admitted through the pipe 5 flows up through the tin, which is preferably divided into irregular masses to provide numerous interstices, and being brought into close association with the tin combines rapidly therewith. Anhydrous stannic chlorid is thus produced, which, trickling down through the tin, collects in the bottom of the chamber 9 below the perforated partition 16, whence all or as much of it as desired is delivered to the saturator or drier 2 by the pipe 6 before mentioned. During the reaction between the tin and the chlorin the heat produced is taken up, by the cooling medium in the jacket 10 and cooling pipe 13, at a rate sufficient to keep the temperature in the absorber preferably at about 35° C. This temperature can readily be secured by having the cooling fluid delivered at sufficiently low temperature, or by regulating the flow of the fluid through the jacket, or both, as will be readily understood. As the tin in the absorber is consumed, fresh metal may be added from time to time, preferably by means of a hopper 9ª, constructed in any well known way to permit the introduction of charges without the escape of vapor in any material amount. The process is thus made continuous. Instead of passing all the bichlorid from the absorber through the saturator, more or less of the liquid may be delivered directly to the finisher (hereafter described) by means of a pipe 6ª leading thereto from the bottom of the chamber 9.

As previously stated, the anhydrous chlorid flowing from the saturator 2 contains chlorin in solution. The dissolved chlorin can be removed in any convenient way, but I prefer to combine it with tin and thus utilize it for the production of stannic chlorid. This can be done in a suitable vessel 18, which for convenience may be termed the finisher. This vessel is divided into compartments by partitions 19, and into the first compartment the liquid anhydrous bichlorid from the saturator 2 is delivered by the pipe 7, which extends to a point near the bottom of the vessel 18. The upper part of each compartment is in communication with the next through pipes 20 extending adjacent to the bottom of the finisher, as shown, so that the current of the chlorid is upward in each compartment. The chlorid, and hence also the chlorin dissolved in it, are thus brought into intimate association with loose masses of metallic tin suspended in the compartments in baskets 21, with the result that the dissolved chlorin combines with the tin, forming anhydrous stannic chlorid, which flows off with the rest through the outlet pipe 22 leading to a suitable storage reservoir, not shown. The anhydrous stannic chlorid vapor in the absorber is conducted from the top thereof through a pipe 23 to a suitable condenser 24, provided with an inlet pipe 25 for a suitable cooling fluid and with an outlet pipe 26 for the discharge of the same. From the bottom of the condenser the stannic chlorid is led by a pipe 27 to the pipe 6ª, thence it is delivered to the finisher 18 for the removal of dissolved chlorin. Any stannic chlorid vapor which may escape condensation is conducted through a pipe 28 to a suitable washer 29, where it is brought into contact with water sprayed from a nozzle 30. The vapor there combines with the water to form hydrate, which goes into solution and flows out through an outlet pipe 31. If desired, the weak hydrate solution may be returned (by any suitable means not shown) to the spray nozzle, and this procedure may be kept up until the solution is strong enough for efficient utilization.

If desired, a suitable fan may be introduced at a convenient point, as at 32 in the pipe 29, to maintain the gas and vapor at an efficient rate of flow through the apparatus.

As previously stated, the liquid anhydrous stannic chlorid, delivered from the finisher 18, may be marketed in such form, but it is preferable first to convert it into a hydrate, for example penta-hydrate. For this purpose I provide a vessel 33, having a jacket 34; a cooling medium from pipe 35, or a heating medium from pipe 36, being delivered thereto through a pipe 37 and discharged through an outlet pipe 38. The ice which is used in making the hydrate is placed in the vessel 33, and the liquid anhydrous bichlorid is admitted through a pipe 39 extending to the bottom of the vessel. As an example of the use of this apparatus, (which may be conveniently termed the converter,) for making a hydrate, the specific example of making the penta-hydrate hereinbefore given may be referred to. In that instance, 60 lbs. of ice is placed in the vessel 33 and 743.5 lbs. of the anhydrous stannic chlorid, previously cooled to about 0° C., is then run in through the pipe 39. During the addition of the bichlorid brine at a temperature of about −10° C. is passed around the vessel, and when no more heat is evolved, and the temperature in the vessel has reached about 0° C., 196.5 lbs. more ice is added. Finally, when the reaction is completed, the temperature is allowed to rise to about 5° C. above the melting point of the hydrate, the increase of temperature being aided if necessary by introducing warmer fluid into the jacket. The melted hydrate is then drawn off through an outlet pipe 40 into suitable molds in which the hydrate cools and solidifies.

The method herein described has been found in practice to yield highly satisfactory results, being economical to a marked degree. No deleterious by-products are formed, and the purity of the bichlorid or the hydrate depends practically entirely upon the purity of the tin and chlorin employed.

While this process has been described in detail with reference to the production of stannic chlorid, it is obvious that various modifications can be made, and the process can be used in connection with the production of various other substances, and the invention is limited only by the scope of the appended claims.

What I claim is:

1. In a process of producing stannic chlorid, passing chlorin over liquid anhydrous stannic chlorid under conditions whereby the moisture in the chlorin will combine with the stannic chlorid forming a specifically heavier hydrate which drops below the surface of the anhydrous liquid stannic chlorid and is thus removed from the sphere of action, combining the chlorin thus dried with tin to produce stannic chlorid, and treating the chlorin gas entering the process with at least a part of the stannic chlorid thereby produced.

2. In a process of producing stannic chlorid, passing chlorin over liquid anhydrous stannic chlorid, whereby moisture in the chlorin will be removed by combination with the vapor of the stannic chlorid; passing the chlorin thus dried, in contact with metallic tin, collecting the stannic chlorid thus formed, and passing the same with the anhydrous stannic chlorid remaining from the step of drying the chlorin, in contact with metallic tin to remove dissolved chlorin therefrom by causing the same to combine with the tin to form an additional amount of stannic chlorid.

3. In a process of producing stannic chlorid, passing chlorin over liquid anhydrous stannic chlorid under conditions whereby moisture in the chlorin will combine with the stannic chlorid and form a specifically heavier hydrate which drops below the surface of the anhydrous liquid stannic chlorid and is thus removed from the sphere of action, passing the chlorin gas thus dried into contact with metallic tin, collecting the stannic chlorid thus formed and bringing a part of the same into contact with the chlorin gas entering the process, and bringing another part thereof into contact with metallic tin to remove dissolved chlorin by permitting the same to combine with the tin to form an additional amount of stannic chlorid.

4. In the manufacture of stannic chlorid, the method of drying chlorin gas, which comprises passing the chlorin gas over liquid anhydrous stannic chlorid, at temperature below 80° C., whereby the moisture in the gas unites with the anhydrous stannic chlorid to produce the specifically heavier hydrate which drops below the surface of the anhydrous stannic chlorid, and is thereby removed from the sphere of action.

5. A process of making stannic chlorid which comprises passing chlorin gas in a tortuous path over the surface of a flowing body of anhydrous stannic chlorid, at a temperature below the melting point of hydrated stannic chlorid whereby the moisture of the gas combines with the stannic chlorid and produces the specifically heavier hydrated stannic chlorid, which drops below the surface and out of contact with the chlorin gas; passing said dried gas in contact with a body of metallic tin, and removing the heat of reaction from the interior and independently from the exterior of said body of tin; drawing off one portion of the liquid stannic chlorid and passing the same in contact with the chlorin gas entering the process; drawing off another portion of the liquid stannic chlorid produced; cooling the gases and vapors from the step of reacting on tin with chlorin, to condense at least a part of the stannic chlorid contained therein; uniting the anhydrous stannic chlorid remaining from the step of treating the chlorin gas with stannic chlorid, with that portion drawn off from the reaction vessel, and that condensed from the exit gases and passing the mixture in contact with metallic tin, in tortuous course.

6. A process of drying a gas which comprises passing the gas in contact with a liquid of such a nature as to unite with the moisture present in said gas to produce a solid product which will separate from said liquid, while maintaining said liquid at a temperature below the melting point of said solid product.

7. A process of drying a gas which comprises passing the gas in a tortuous path in contact at a plurality of points of said path with a liquid of such a nature as to unite with the moisture present in said gas to produce a solid product which will separate from said liquid, while maintaining said liquid at a temperature below the melting point of said solid product.

8. A process of drying a gas which comprises passing the gas in contact with an anhydrous liquid of such a nature as to unite with the moisture present in said gas to produce a solid product which will separate from said liquid, while maintaining said liquid at a temperature below the melting point of said solid product.

9. A process of drying a gas which comprises passing the gas in contact with the surface of a flowing liquid of such a nature as to unite with the moisture present in said gas to produce a product which will separate from said liquid.

10. A process of drying a gas which comprises passing the gas in contact with a counter current of a constantly renewed liquid of such a nature as to unite with the moisture present in said gas to produce a product which will separate from said liquid.

11. A process of drying a gas which comprises passing the gas in contact with anhydrous stannic chlorid under temperature conditions favorable to the formation and separation of hydrated stannic chlorid from the anhydrous stannic chlorid.

12. A process of drying a gas which comprises passing the gas in contact with anhydrous stannic chlorid under temperature conditions favorable to the formation of hydrated stannic chlorid and to the precipitation thereof to below the surface of the anhydrous stannic chlorid.

13. A process of drying chlorin gas which comprises passing the gas in a tortuous path in contact at a plurality of points of said path with the surface of flowing anhydrous stannic chlorid under temperature conditions favorable to the formation of hydrated stannic chlorid and to the precipitation thereof to below the surface of the anhydrous stannic chlorid.

14. A process of treating a gaseous mixture which comprises passing the gas in contact with a liquid of such a nature as to unite with a normally liquid constituent of the gaseous mixture to produce a solid product which will separate from said liquid, while maintaining said liquid at a temperature below the melting point of said solid product.

15. A process of removing a particular constituent from a gaseous mixture which comprises passing the gaseous mixture in contact with an anhydrous liquid of such a nature as to unite with a constituent of the gaseous mixture to produce a solid product which will automatically separate from said liquid, while maintaining said liquid at a temperature below the melting point of said solid product.

16. A process of treating a gaseous mixture which comprises passing the gas in contact with a liquid of such a nature as to unite with a constituent of the gaseous mixture to produce a product which will separate from said liquid thereafter drawing off the unacted upon liquid and leaving the separated solid, melting the latter and drawing off the same.

17. A process of treating a gaseous mixture which comprises passing the same in a tortuous path in contact at a plurality of points of said path with the surface of a flowing body of a liquid of such a nature as to unite with a normally liquid constituent of said gaseous mixture to produce a solid product which will be of greater specific gravity than said liquid and will settle to the bottom thereof; and thereafter drawing off the unacted upon liquid and leaving the separated solid, melting the latter and drawing off the same.

18. A process of producing stannic chlorid, which comprises reacting upon a stationary body of metallic tin with chlorin gas, separating the stannic chlorid formed from the metallic tin, cooling the vapors and gases leaving the reaction vessel to condense stannic chlorid therefrom, treating a portion of the separated stannic chlorid with the chlorin gas entering the process and removing the unacted upon portion after treatment with said gas, and passing all of the anhydrous stannic chlorid in contact with metallic tin to remove dissolved chlorin therefrom.

19. A process of removing vapors of chlorid of a metal from a gaseous body containing the same which comprises cooling the gaseous body sufficiently to cause condensation of a part of said vapors, and thereafter washing the gaseous body repeatedly with the same volume of liquid.

20. A process of removing vapors of stannic chlorid from a gaseous body which comprises cooling the gaseous body sufficiently to cause condensation of a part of said vapors, and thereafter washing the gaseous body repeatedly with the same volume of liquid.

WILLIAM F. DOERFLINGER.

Witnesses:
 EDWARD MALONE,
 JOHN P. WILLIAMS.